US012583331B2

(12) United States Patent     (10) Patent No.:   US 12,583,331 B2

Isami et al.            (45) Date of Patent:    Mar. 24, 2026

(54) BATTERY ELECTRIC VEHICLE

(71) Applicant: TOYOTA JIDOSHA KABUSHIKI KAISHA, Toyota (JP)

(72) Inventors: Yoichiro Isami, Mishima (JP); Kenji Mizutani, Toyota (JP); Hirotaka Ikegami, Toyota (JP); Akihito Yasue, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 90 days.

(21) Appl. No.: 18/455,779

(22) Filed: Aug. 25, 2023

(65) Prior Publication Data

US 2024/0190262 A1    Jun. 13, 2024

(30) Foreign Application Priority Data

Dec. 9, 2022    (JP) ................................. 2022-197106

(51) Int. Cl.
    B60L 15/20       (2006.01)
    B60W 30/182     (2020.01)

(52) U.S. Cl.
    CPC .................................... B60L 15/20 (2013.01)

(58) Field of Classification Search
    CPC .............................. B60L 15/20; B60W 30/182
    See application file for complete search history.

(56) References Cited

U.S. PATENT DOCUMENTS

| | | | |
|---|---|---|---|
| 2013/0184922 A1* | 7/2013 | Kabe ..................... | B60W 20/10 |
| | | | 180/65.23 |
| 2016/0244045 A1* | 8/2016 | Sato ...................... | B60W 20/15 |
| 2017/0087994 A1* | 3/2017 | Kakisako ......... | B60W 30/18118 |
| 2020/0384978 A1 | 12/2020 | Abe et al. | |
| 2021/0229550 A1* | 7/2021 | Isami .................. | B60L 15/2054 |
| 2023/0249670 A1* | 8/2023 | Oosawa ................ | B60W 10/06 |
| | | | 701/22 |

FOREIGN PATENT DOCUMENTS

| | | |
|---|---|---|
| JP | 2020-156260 A | 9/2020 |
| JP | 2021-118569 A | 8/2021 |
| JP | 2022-014672 A | 1/2022 |
| JP | 2022-030479 A | 2/2022 |
| JP | 2022-036819 A | 3/2022 |
| WO | 2019/111458 A1 | 6/2019 |

* cited by examiner

*Primary Examiner* — Tan Q Nguyen

(74) *Attorney, Agent, or Firm* — SoraIP, Inc.

(57) ABSTRACT

Battery electric vehicle includes an accelerator pedal, a shifter, a mode selection device, and a control device. When the electric motor is controlled in EV mode, the control device changes the output of the electric motor in accordance with the operation of the accelerator pedal regardless of the operation position of the shifter, and when the electric motor is controlled in MT mode, the control device changes the output characteristic of the electric motor with respect to the operation of the accelerator pedal in accordance with the operation position of the shifter. When battery electric vehicle is activated, the mode selection device automatically selects a particular control mode, preferably an EV mode, between EV mode and MT mode.

3 Claims, 6 Drawing Sheets

BATTERY ELECTRIC VEHICLE

CROSS-REFERENCE TO RELATED APPLICATION

This application claims priority to Japanese Patent Application No. 2022-197106 filed on Dec. 9, 2022, incorporated herein by reference in its entirety.

BACKGROUND

1. Technical Field

The present disclosure relates to a battery electric vehicle that uses an electric motor as a power device for traveling.

2. Description of Related Art

Japanese Unexamined Patent Application Publication No. 2021-118569 (JP 2021-118569 A) discloses a technique for simulating a torque characteristic such as that of a vehicle including a manual transmission and an internal combustion engine (hereinafter referred to as an MT vehicle) by controlling a motor torque of a battery electric vehicle.

SUMMARY

A driver can selectively enjoy both driving like an MT vehicle and driving as a normal battery electric vehicle by switching between a control mode in which a torque characteristic such as that of an MT vehicle is obtained and a control mode in which a torque characteristic of a normal battery electric vehicle is obtained. However, on the other hand, when the control mode at the time of starting the vehicle is different each time, the driver has to deal with the difference in the operation of the vehicle due to the difference in the control mode, which makes the driver feel troublesome.

The present disclosure has been made in view of the above problems. It is an object of the present disclosure to eliminate the troublesomeness caused by the fact that the control mode at the time of starting the vehicle is not determined, while enabling selective enjoyment of both driving like an MT vehicle and driving as a normal battery electric vehicle by switching the control mode in a battery electric vehicle in which an electric motor is used as a power device for traveling.

The present disclosure provides a battery electric vehicle for achieving the above object. A battery electric vehicle of the present disclosure includes: an accelerator pedal; a shifter; a mode selection device; and a control device.

The mode selection device is a device that selects either a first mode or a second mode as a control mode of the electric motor in accordance with a mode selection operation of a driver.

The control device is a device that controls the electric motor in accordance with the control mode selected by the mode selection device.

The control device is configured to, when the electric motor is controlled in the first mode, change output of the electric motor in accordance with an operation of the accelerator pedal regardless of an operation position of the shifter, and when the electric motor is controlled in the second mode, change an output characteristic of the electric motor with respect to an operation of the accelerator pedal in accordance with an operation position of the shifter.

The mode selection device is configured to automatically select a particular control mode among the first mode and the second mode when the battery electric vehicle is started.

According to the battery electric vehicle of the present disclosure, the driver is allowed to selectively enjoy both driving as a normal battery electric vehicle by the selection of the first mode and driving like an MT vehicle by the selection of the second mode, and the driver does not feel troublesome due to the fact that the control mode at the time of starting the vehicle is not determined.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 5 is a block-diagram illustrating an exemplary MT vehicle-model included in the control device illustrated in FIG. 3; and.

DETAILED DESCRIPTION OF EMBODIMENTS

1. Configuring Battery Electric Vehicle

Figure 1:
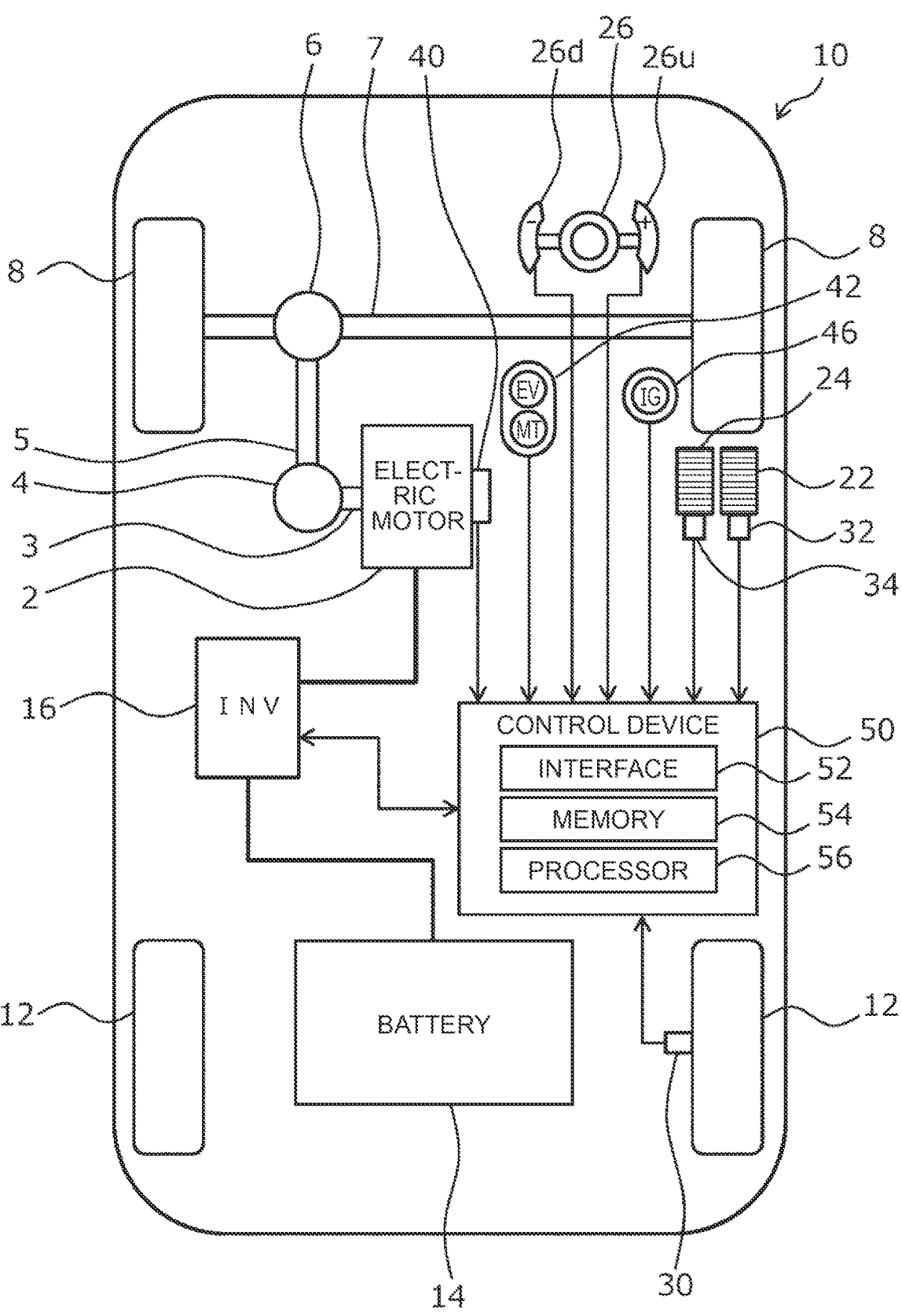
FIG. 1 is a diagram schematically illustrating a configuration of a battery electric vehicle according to an embodiment of the present disclosure.

FIG. 1 is a diagram schematically illustrating a configuration of a power system of a battery electric vehicle 10 according to the present embodiment. As shown in FIG. 1, battery electric vehicle 10 includes an electric motor 2 as a power source. The electric motor 2 is, for example, a brushless DC motor or a three-phase AC synchronous motor. The electric motor 2 is provided with a rotational speed sensor 40 for detecting the rotational speed thereof. The output shaft 3 of the electric motor 2 is connected to one end of the propeller shaft 5 via a gear mechanism 4. The other end of the propeller shaft 5 is connected to a drive shaft 7 in front of the vehicle via a differential gear 6.

Battery electric vehicle 10 includes drive wheels 8, which are front wheels, and driven wheels 12, which are rear wheels. The drive wheels 8 are respectively provided at both ends of the drive shaft 7. Each of the wheels 8 and 12 is provided with a wheel speed sensor 30. In FIG. 1, only the wheel speed sensor 30 of the right rear wheel is represented. The wheel speed sensor 30 is also used as a vehicle speed sensor for detecting the vehicle speed of battery electric vehicle 10. The wheel speed sensor 30 is connected to a control device 50, which will be described later, by an in-vehicle network such as a controller area network (CAN).

Battery electric vehicle 10 includes a battery 14 and an inverter 16. The battery 14 stores electric energy for driving the electric motor 2. That is, battery electric vehicle 10 is a battery electric vehicle (BEV) that runs with the electric energy stored in the battery 14. The inverter 16 converts the DC power input from the battery 14 into the drive power of the electric motor 2. The power is converted by the inverter 16 by PWM control by the control device 50. The inverter 16 is connected to the control device 50 by an in-vehicle network.

Battery electric vehicle 10 includes an accelerator pedal 22 for inputting an acceleration request and a brake pedal 24 for inputting a braking request as an operation request input device for the driver to input an operation request for battery electric vehicle 10. The accelerator pedal 22 is provided with an accelerator position sensor 32 for detecting an accelerator operation amount that is an operation amount of the accelerator pedal 22. The brake pedal 24 is provided with a brake position sensor 34 for detecting a brake depression amount which is an operation amount of the brake pedal 24. The accelerator position sensor 32 and the brake position sensor 34 are connected to the control device 50 by an in-vehicle network.

Battery electric vehicle 10 further includes a pseudo paddle shifter 26 as an operation-input device. A paddle shifter, i.e., a paddle sequential shifter, is a device that operates a sequential manual transmission (SMT), but of course battery electric vehicle 10 does not have a SMT. The pseudo paddle shifter 26 is a dummy that is different from the original paddle shifter. Typically, MT vehicles with paddle shifters are clutch pedal-less MT vehicles without clutch pedals. Therefore, battery electric vehicle 10 includes a pseudo paddle shifter 26, but does not include a pseudo clutch pedal that resembles a clutch pedal.

The pseudo paddle shifter 26 is structured to resemble a paddle shifter included in a clutch pedal-less MT vehicle. The pseudo paddle shifter 26 is attached to a steering wheel. The pseudo paddle shifter 26 includes an upshift switch 26$u$ and a downshift switch 26$d$. The upshift switch 26$u$ is provided on the right side of the steering wheel, and the downshift switch 26$d$ is provided on the left side of the steering wheel. The upshift switch 26$u$ and the downshift switch 26$d$ can be operated independently. The upshift switch 26$u$ emits a signal by being pulled to the front side, and the downshift switch 26$d$ also emits a signal by being pulled to the front side. Hereinafter, an operation of pulling the upshift switch 26$u$ toward the front is referred to as an upshift operation. Further, a signal generated by the upshift switch 26$u$ by the upshift operation is referred to as an upshift signal. Further, the operation of pulling the downshift switch 26$d$ to the front is referred to as a downshift operation. Further, a signal generated by the downshift switch 26$d$ by the downshift operation is referred to as a downshift signal. The upshift switch 26$u$ and the downshift switch 26$d$ are connected to the control device 50 by an in-vehicle network.

Battery electric vehicle 10 includes a mode selection switch 42. The mode selection switch 42 is a switch for selecting a control mode of the electric motor 2. The control mode of the electric motor 2 includes an MT mode and an EV mode. The mode selection switch 42 is configured to be capable of arbitrarily selecting one of MT mode and EV mode. As will be described later, in EV mode, the electric motor 2 is controlled in a normal control mode (first mode) for a typical battery electric vehicle. In MT mode, the electric motor 2 is controlled in a control mode (second mode) for operating battery electric vehicle 10 like an MT vehicle. The mode selection switch 42 is connected to the control device 50 by an in-vehicle network.

Battery electric vehicle 10 includes an activation switch 46. When the activation switch 46 is turned on, an activation signal is input from the activation switch 46 to the control device 50. When the activation switch 46 is turned off, a stop signal is input from the activation switch 46 to the control device 50. Battery electric vehicle 10 is activated by inputting an activation signal to the control device 50, and battery electric vehicle 10 is allowed to travel. Battery electric vehicle 10 is stopped by inputting a stop signal to the control device 50, and battery electric vehicle 10 cannot travel.

The control device 50 is typically an electronic control unit (ECU) mounted on a battery electric vehicle 10. The control device 50 may be a combination of a plurality of ECU. The control device 50 includes an interface 52, a memory 54, and a processor 56. An in-vehicle network is connected to the interface 52. The memory 54 include RAM for temporarily recording data and ROM for storing various data related to programs and programs executable by the processor 56. The program is composed of a plurality of instructions. The processor 56 reads and executes programs and data from the memory 54, and generates a control signal based on a signal acquired from each sensor.

Figure 2:
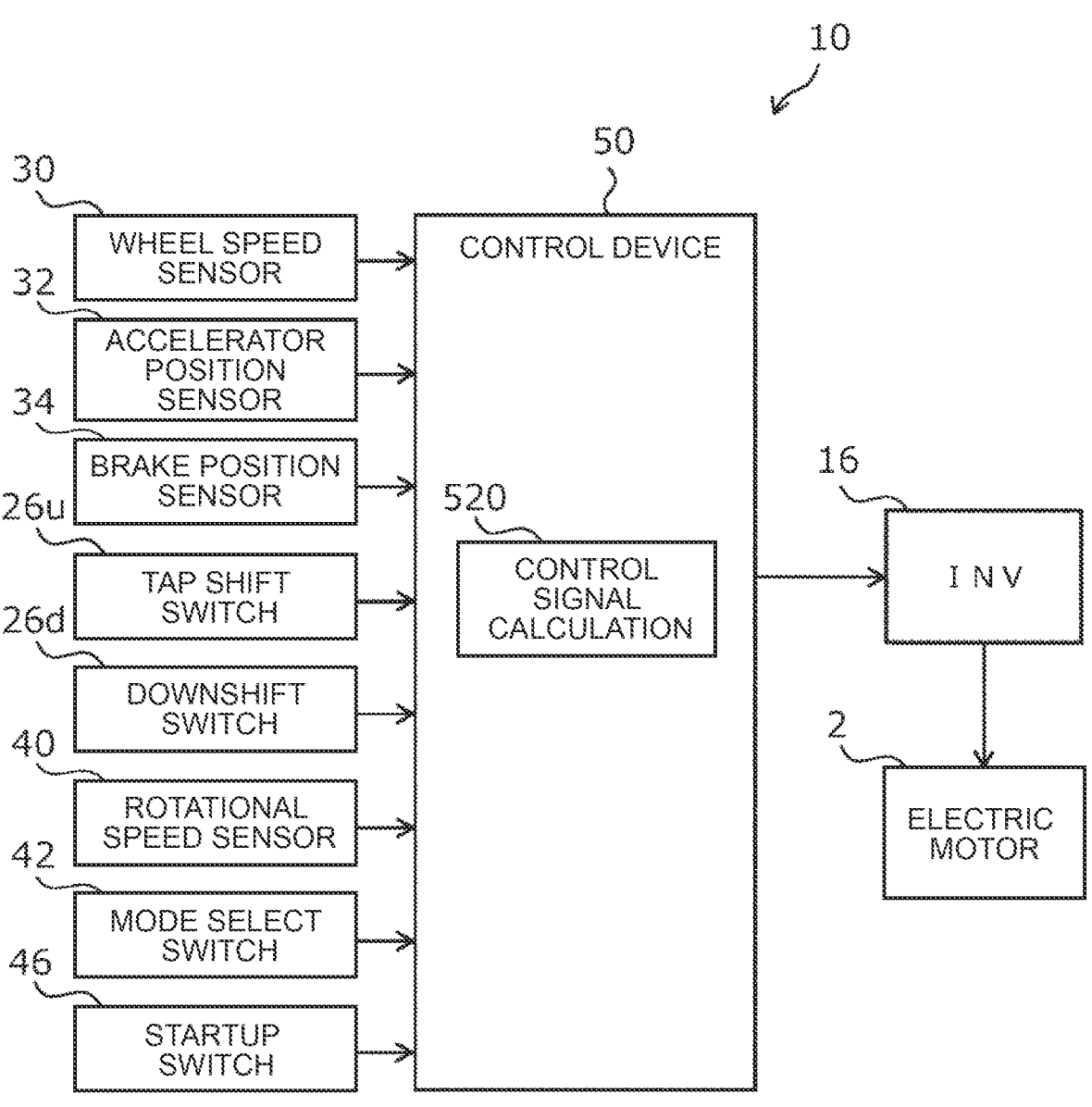
FIG. 2 is a block-diagram illustrating a configuration of a control system of battery electric vehicle illustrated in FIG. 1.

FIG. 2 is a block diagram illustrating a configuration of a control system of battery electric vehicle 10 according to the present embodiment. The control device 50 receives at least signals from the wheel speed sensor 30, the accelerator position sensor 32, the brake position sensor 34, the upshift switch 26$u$, the downshift switch 26$d$, the rotational speed sensor 40, the drive mode selection switch 42, and the activation switch 46. Further, the control device 50 outputs a signal to at least the inverter 16. Although not shown, various other sensors, actuators, and indicators are mounted on battery electric vehicle 10.

The control device 50 has a function as the control signal calculation unit 520. Specifically, when the program stored in the memory 54 is executed by the processor 56, the processor 56 functions as at least the control signal calculation unit 520. The control signal calculation is a function of calculating a control signal for an actuator or a device. The control signal includes at least a signal for PWM controlling the inverter 16. Hereinafter, the functions of the control device 50 will be described.

Figure 3:
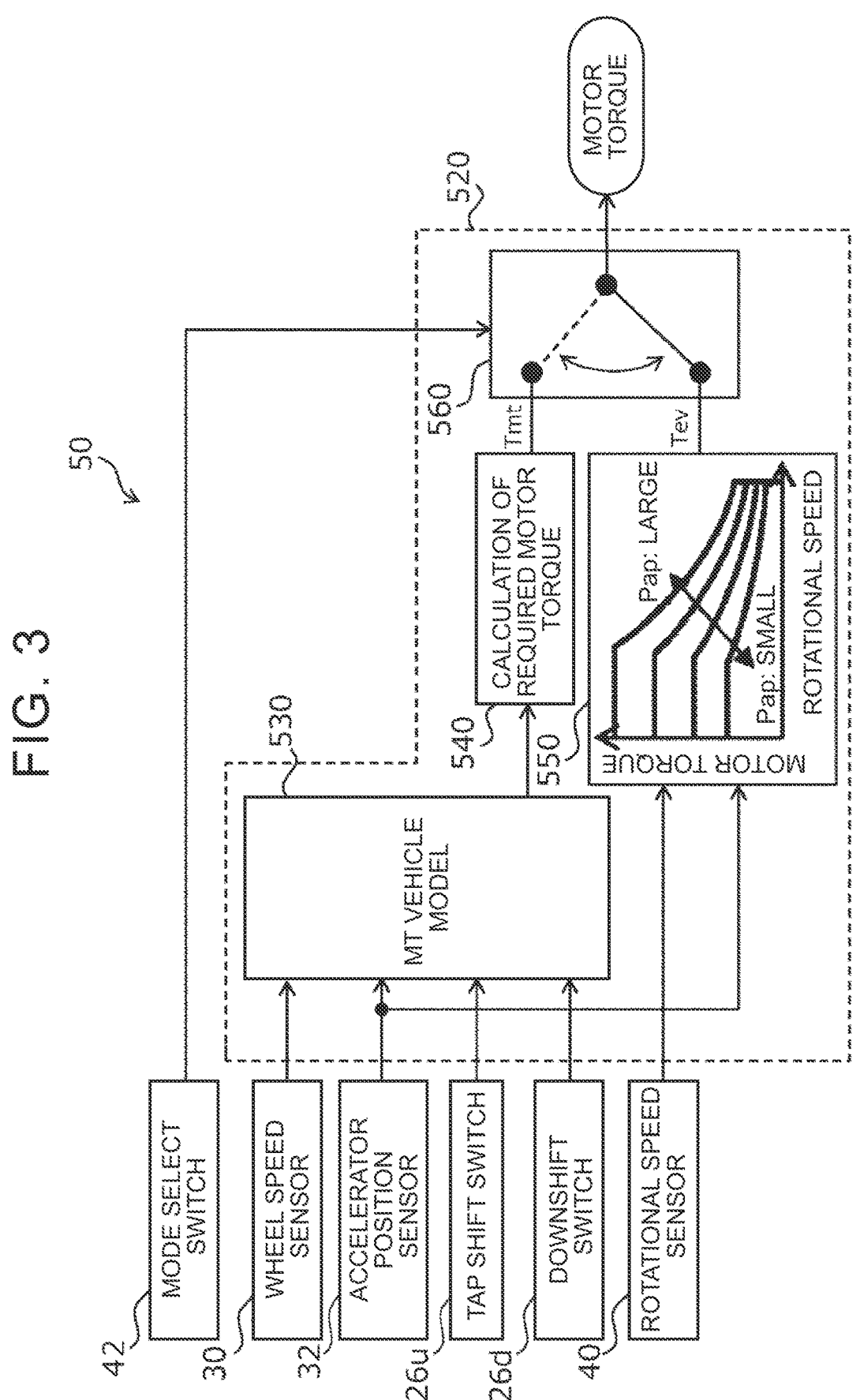
FIG. 3 is a block-diagram showing the function of the control device of battery electric vehicle shown in FIG. 1.

2. Function of the Controller 2-1. Motor Torque Calculation Function 2-1-1. Function of the Control Signal Calculation Unit FIG. 3 is a block diagram illustrating functions of the control device 50 according to the present embodiment, particularly functions related to calculation of a motor torque command value for the electric motor 2. The control device 50 calculates a motor torque command value by the function shown in the block diagram, and generates a control signal for PWM controlling the inverter 16 based on the motor torque command value.

As illustrated in FIG. 3, the control signal calculation unit 520 includes an MT vehicle model 530, a required motor torque calculator 540, a motor torque command map 550, and a changeover switch 560. The control signal calculation unit 520 receives signals from the wheel speed sensor 30, the accelerator position sensor 32, the upshift switch 26$u$, the downshift switch 26$d$, the rotational speed sensor 40, and the mode selection switch 42. The control signal calculation unit 520 processes signals from these sensors, and calculates a motor torque to be output to the electric motor 2.

There are two types of calculation of the motor torque by the control-signal calculation unit 520: calculation using MT vehicle model 530 and the required motor torque calculator 540; and calculation using the motor torque command map 550. The former is used to calculate the motor torque when battery electric vehicle 10 is driven in MT mode. The latter is used to calculate the motor torque when battery electric vehicle 10 is driven in EV mode. Which motor torque is used is determined by the changeover switch 560. The changeover switch 560 operates according to a signal input from the mode selection switch 42. The changeover switch 560 and the mode selection switch 42 constitute a mode selection device.

2-1-2. Calculating Motor Torque in MT Mode

MT vehicle model 530 is a model that calculates the drive wheel torque that would be obtained by operating the accelerator pedal 22 and the pseudo paddle shifter 26, assuming that battery electric vehicle 10 is a clutch pedal-less MT vehicle. A clutch pedal-less MT vehicle is an MT vehicle that includes an engine, an SMT, and a clutch that connects the engine and SMT, but does not include a clutch pedal because the clutch is automatically operated. Drive wheel torque in clutch pedal-less MT vehicles is determined by the operation of a gas pedal to control fueling to the engine and the operation of a paddle shifter to switch gear stages of SMT. The engine may be a spark ignition engine or a diesel engine. Hereinafter, engines, clutches, and SMT that are hypothetically realized by MT vehicle model 530 are referred to as virtual engines, virtual clutches, and virtual SMT, respectively.

The accelerator operation amount Pap detected by the accelerator position sensor 32 is inputted to MT vehicle-model 530. Further, MT vehicle model 530, as an input of the operation of the paddle shifter to determine the gear stage of the virtual SMT, an up-shift signal Su sent from the up-shift switch 26u, a down-shift signal Sd sent from the down-shift switch 26d is input. Further, the vehicle speed Vw (or the wheel speed) detected by the wheel speed sensor 30 is also inputted to MT of the vehicle model 530 as a signal indicating the load-state of the vehicle.

The required motor torque calculator 540 converts the drive wheel torque Tw calculated by MT vehicle model 530 into a required motor torque Tm. The required motor torque Tm is the motor torque required to realize the drive wheel torque Tw calculated by MT vehicle model 530. In order to convert the drive wheel torque Tw into the required motor torque Tm, a reduction ratio from the output shaft 3 of the electric motor 2 to the drive wheels 8 is used.

2-1-3. Calculating Motor Torque in EV Mode

In EV mode, even if the driver operates the pseudo paddle shifter 26, the operation is not reflected in the driving of battery electric vehicle 10. That is, in EV mode, the manipulation of the pseudo paddle shifter 26 is disabled. The motor torque command map 550 used for calculating the motor torque in EV mode is a map for determining the motor torque using the accelerator opening degree and the rotational speed of the electric motor 2 as parameters. A signal of the accelerator position sensor 32 and a signal of the rotational speed sensor 40 are input to each parameter of the motor torque command map 550. The motor torque corresponding to these signals is output from the motor torque command map 550.

2-1-4. Motor Torque Switching

The motor torque calculated using the motor torque command map 550 is referred to as Tev, and the motor torque calculated using MT vehicle model 530 and the required motor torque calculator 540 is referred to as Tmt. The motor torque selected by the changeover switch 560 of the two motor torque Tev, Tmt is given to the electric motor 2 as a motor torque command. However, while the motor torque Tev is being outputted as the motor torque command, the motor torque Tmt using MT vehicle model 530 is continuously calculated. Conversely, the motor torque Tev is continuously calculated even while the motor torque Tmt is outputted as the motor torque command. That is, both the motor torque Tev and the motor torque Tmt are continuously inputted to the changeover switch 560.

The changeover switch 560 operates in accordance with the control mode selected by the mode selection switch 42. When EV mode is selected by the mode selection switch 42, the changeover switch 560 is connected to the motor torque command map 550 and outputs the motor torque Tev input from the motor torque command map 550 as the motor torque command value. When MT mode is selected by the mode selection switch 42, the changeover switch 560 switches the connection destination to the required motor torque calculator 540. Then, the changeover switch 560 outputs the motor torque Tmt inputted from the required motor torque calculator 540 as the motor torque command. Such input switching is performed in conjunction with the selection of the control mode by the mode selection switch 42.

However, when battery electric vehicle 10 is started, the changeover switch 560 automatically connects to a preset start-up connection destination regardless of which control mode has been selected in the previous trip. The start-up connection destination can be arbitrarily set by the driver by a hard switch or by a soft switch. In the initial setting, the start-up connection destination of the changeover switch 560 is the motor torque command map 550. That is, when the driver turns on the activation switch 46, initialization is performed so that the driver always starts up in EV mode. In EV mode, even if the driver is anyone, that is, if the driver is not good at driving MT vehicles, the driving can be started without difficulty. If the driver desires to start the motor in MT mode, the destination at the time of starting the changeover switch 560 may be the required motor torque calculator 540 by changing the setting.

Figure 4:
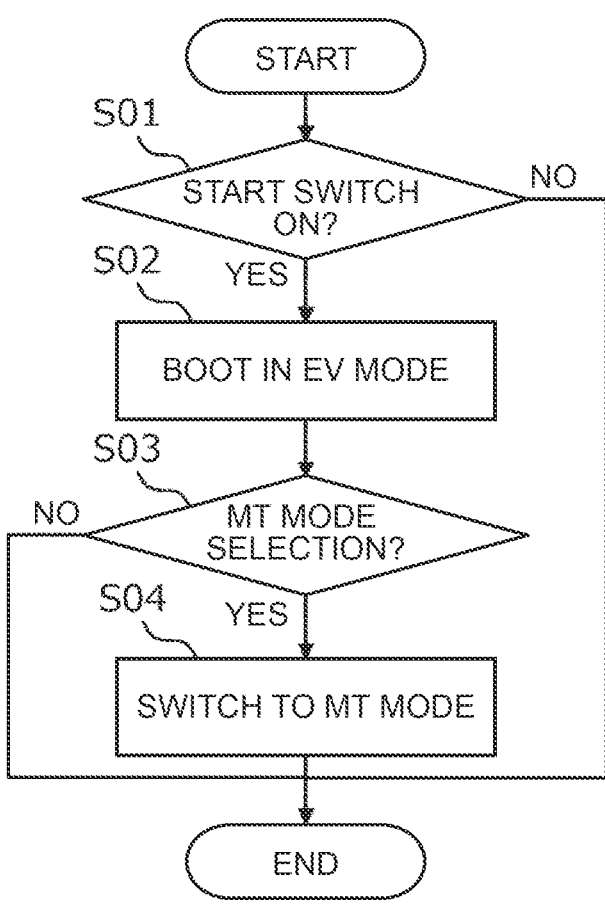
FIG. 4 is a flowchart illustrating a procedure of a mode switching process performed by the mode selection device.

FIG. 4 is a flowchart illustrating a procedure of a mode switching process performed by the mode selection device including the mode selection switch 42 and the changeover switch 560. Here, it is assumed that the control mode at the time of startup is EV mode which is the default setting.

In S01, it is determined whether the activation switch 46 has been turned on. The system is stopped until the activation switch 46 is turned on. When the activation switch 46 is turned on, the process proceeds to S02.

In S02, the changeover switch 560 is automatically connected to the motor torque command map 550 regardless of whether the previous trip ended in EV or MT control mode. That is, EV mode is automatically selected by turning on the activation switch 46, and battery electric vehicle 10 is always activated in EV mode. The process then proceeds to S03.

In S03, it is determined whether MT mode has been selected by the mode selection switch 42. Control of the electric motor 2 in EV mode is continued until MT mode is selected. If MT is selected, the process proceeds to S04.

In S04, the connection destination of the changeover switch 560 is switched from the motor torque command map 550 to the required motor torque calculator 540. Thus, the control mode is switched from EV mode to MT mode.

2-2. MT Vehicles 2-2-1. Overview

Figure 5:
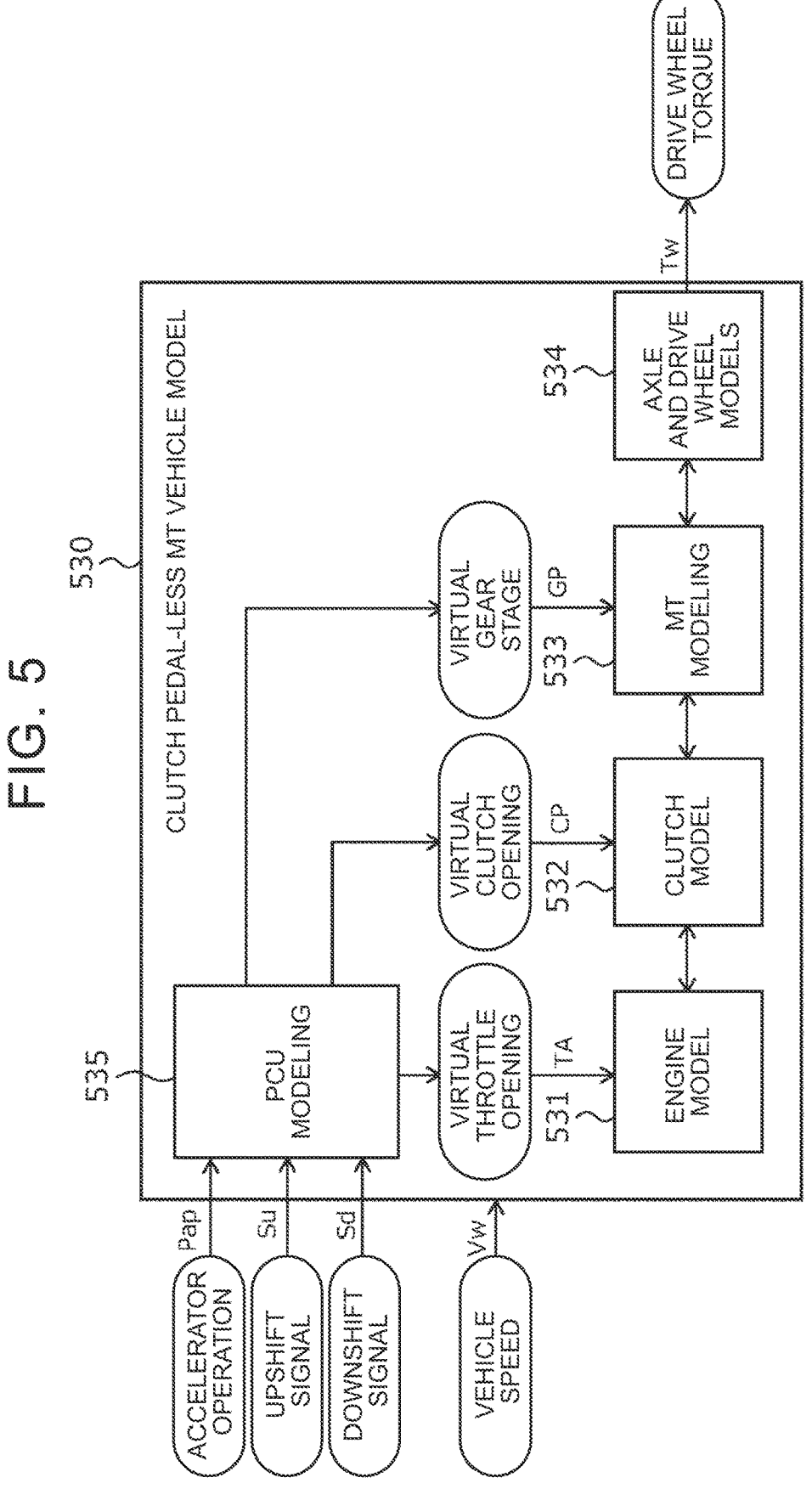

Next, MT vehicle-model 530 will be described. FIG. 5 is a diagram illustrating an exemplary MT vehicle-model 530. MT vehicle model 530 includes an engine model 531, a clutch model 532, an MT model 533, an axle/drive wheel model 534, and a PCU model 535. In the engine model 531, the virtual engine is modeled. The virtual engine of the present embodiment is a spark ignition type engine in which torque is controlled by an opening degree of a throttle. In the clutch model 532, the virtual clutch is modeled. In MT model 533, the virtual SMT is modeled. In the axle/drive wheel model 534, a virtual torque transmission system from the axle to the drive wheels is modeled. In PCU model 535, some functions of a virtual plant control unit (PCU) that integrally controls a virtual engine, a virtual clutch, and a virtual SMT are modeled. Each model may be represented by, for example, a calculation formula or a map.

The calculation results are input and output between the models. The accelerator operation amount Pap, the upshift signal Su, and the downshift signal Sd inputted to MT vehicular model 530 are used in PCU model 535. The vehicle speed Vw (or wheel speed) is used in a plurality of models. In MT vehicle 530, the drive wheel torque Tw and the virtual engine speed Ne are calculated based on these input-signals.

2-2-2. PCU Modeling

PCU model 535 calculates a virtual throttle opening of the virtual engine, a virtual clutch opening of the virtual clutch, and a virtual gear stage of the virtual SMT. PCU model 535 includes a throttle opening degree model for calculating a virtual throttle opening degree, a clutch opening degree model for calculating a virtual clutch opening degree, and a gear stage model for calculating a virtual gear stage.

The throttle opening degree model receives the accelerator operation amount Pap, the upshift signal Su, and the downshift signal Sd, and outputs a virtual throttle opening degree TA. In the throttle opening degree model, the virtual throttle opening degree TA is associated with the accelerator operation amount Pap, and the virtual throttle opening degree TA is increased as the accelerator operation amount Pap is increased. However, when the upshift signal Su is input and when the downshift signal Sd is input, the virtual throttle opening degree TA is temporarily lowered regardless of the operation amount Pap. This means that the virtual throttle is temporarily closed when a shift operation of the pseudo paddle shifter 26 is performed. The virtual throttle opening degree TA outputted from the throttle opening degree model is inputted to the engine model 531.

The clutch opening degree model receives the upshift signal Su and the downshift signal Sd and outputs a virtual clutch opening degree CP. The virtual clutch opening degree CP is basically set to 0%. That is, the basic state of the virtual clutch is the engaged state. When the upshift signal Su is input and when the downshift signal Sd is input, the virtual clutch opening degree CP is temporarily set to 0%. This means that the virtual clutch is temporarily released when a shift operation of the pseudo paddle shifter 26 is performed. A vehicle speed Vw and a virtual engine rotational speed are used to calculate the virtual clutch opening degree CP when the virtual clutch is engaged. The clutch opening degree model calculates the virtual clutch opening degree CP based on the rotational speed differential so as to smoothly match the rotational speed of the input shaft of the virtual SMT calculated from the vehicle speed Vw with the virtual engine rotational speed. The virtual clutch opening degree CP outputted from the clutch opening degree model is inputted to the clutch model 532.

The gear stage model receives the upshift signal Su and the downshift signal Sd and outputs the virtual gear stage GP. The number of gear stages of the virtual SMT is N (N is a natural number equal to or greater than 2). The virtual gear stage GP is raised by one stage each time the upshift signal Su is inputted. However, when the virtual gear stage GP is the Nth stage, the virtual gear stage GP is maintained at the Nth stage even when the upshift signal Su is inputted. The virtual gear stage GP is lowered by one stage each time the downshift signal Sd is inputted. However, when the virtual gear stage GP is in the first stage, the virtual gear stage GP is maintained in the first stage even when the downshift signal Sd is inputted. The virtual gear stage GP outputted from the gear stage model is inputted to MT model 533.

2-2-3. Engine Model

The engine model 531 calculates a virtual engine speed Ne and a virtual engine power torque Teout. The engine model 531 includes a model for calculating the virtual engine speed Ne and a model for calculating the virtual engine output torque Teout. For example, the following equation (1) is used to calculate the virtual engine speed Ne. In the following equation (1), the virtual engine speed Ne is calculated from the rotational speed Nw of the wheel 8, the overall reduction ratio R, and the slip-rate Rslip of the virtual clutch.

(Mathematical formula 1)

$$Ne = Nw \times R \times [1/(1 - Rslip)] \tag{1}$$

In Equation (1), the rotational speed Nw of the wheel 8 is detected by the wheel speed sensor 30. The overall reduction ratio R is calculated from the gear ratio (transmission ratio) r calculated by MT model 533 described later and the reduction ratio defined by the axle/drive wheel model 534. The slip-rate Rslip is calculated by a clutch model 532 described later.

Equation (1) is a formula for calculating the virtual engine speed Ne when the virtual engine and the virtual SMT are connected by the virtual clutch. If the virtual clutch is disengaged, the virtual engine torque Te generated in the virtual engine can be considered to be used to increase the virtual engine speed Ne. The virtual engine torque Te is a torque obtained by adding a torque due to a moment of inertia to the virtual engine output torque Teout. When the virtual clutch is disengaged, the virtual engine-output-torque Teout is zero. Therefore, when the virtual clutch is disconnected, the engine model 531 calculates the virtual engine speed Ne using the virtual engine torque Te and the moment of inertia J of the virtual engine by the following equation (2). For calculating the virtual engine torque Te, a map having the virtual throttle opening degree TA as a parameter is used.

(Mathematical formula 2)

$$J \times (30/\pi) \times [(d/dt)Ne] = Te \tag{2}$$

During idling of the clutch pedal-less MT vehicles, idle speed control is performed to maintain the engine rotational speed at a constant rotational speed. Therefore, when the virtual clutch is turned off, the vehicle speed is 0, and the virtual throttle opening degree TA is 0%, the engine model 531 calculates the virtual engine speed Ne as a predetermined idling rotation speed (for example, 1000 rpm). When the driver depresses the accelerator pedal 22 to perform the empty blowing while the vehicle is stopped, the idling rotational speed is used as the initial value of the virtual engine speed Ne calculated by Expression (2).

Figure 6:
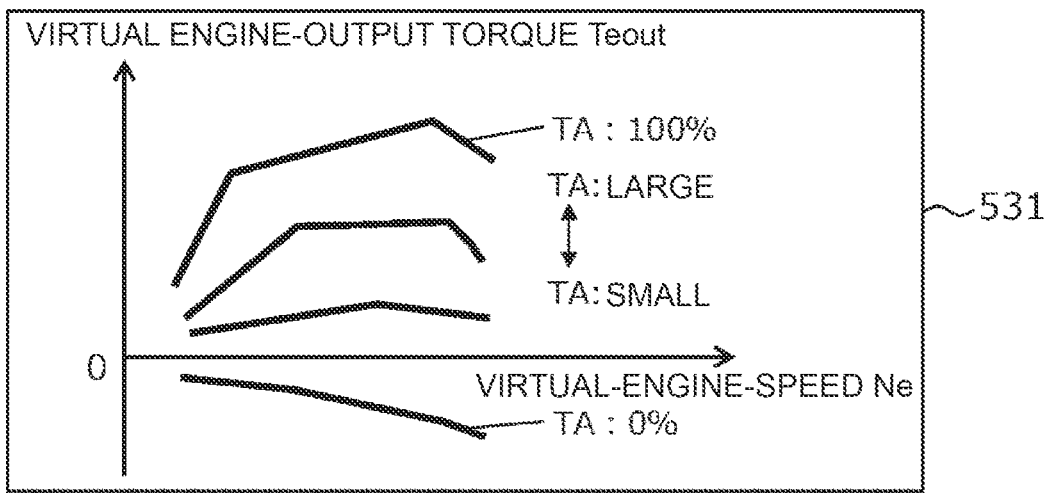
FIG. 6 is a diagram illustrating an exemplary engine model, a clutch model, and a transmission model constituting MT vehicle model illustrated in FIG. 5.
Figure 6:
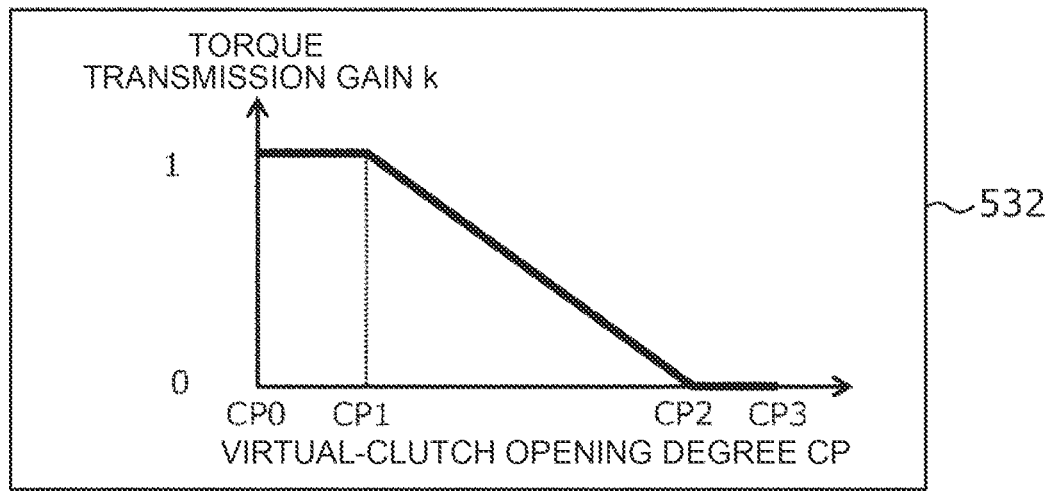
Figure 6:
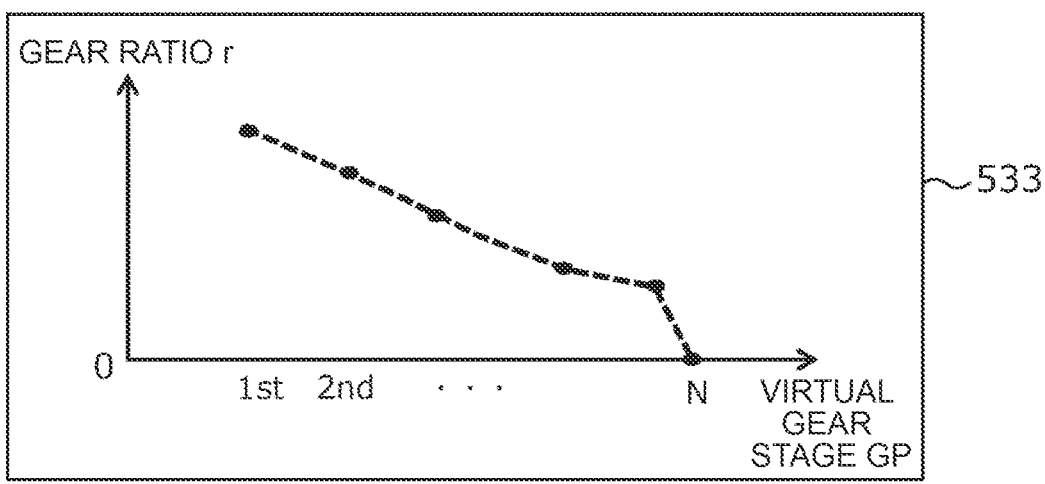

The engine model 531 calculates a virtual engine output torque Teout from the virtual engine speed Ne and the virtual throttle opening degree TA. For example, a map as shown in FIG. 6 is used to calculate the virtual engine-output-torque Teout. This map defines the relation between the virtual throttle opening degree TA, the virtual engine speed Ne, and the virtual engine output torque Teout in the steady-state. In this map, a virtual engine output torque Teout for the virtual engine speed Ne is given for each virtual throttle opening degree TA. The torque characteristic shown in FIG. 6 may be set to a characteristic assumed for a natural intake engine or may be set to a characteristic assumed for a supercharged engine. The torque characteristic shown in FIG. 6 can also be set to a characteristic assuming a diesel engine by replacing the virtual throttle opening degree TA with a virtual fuel-injection quantity. The virtual engine output torque Teout calculated by the engine model 531 is inputted to the clutch model 532.

2-2-4. Clutch Model

The clutch model 532 calculates a torque transmission gain k. The torque transmission gain k is a gain for calculating a torque transmission degree of the virtual clutch according to the virtual clutch opening degree CP. The clutch model 532 has, for example, a map as shown in FIG. 6. In this map, the torque transmission gain k is given to the virtual clutch opening degree CP. In FIG. 6, the torque transmission gain k is given such that the virtual clutch opening degree CP is 1 in a range from CP0 to CP1, the virtual clutch opening degree CP monotonically decreases at a constant inclination from CP1 to 0 in a range from CP2, and the virtual clutch opening degree CP is 0 in a range from CP2 to CP3. Here, CP0 corresponds to a clutch opening degree of 0%, and CP3 corresponds to a clutch opening degree of 100%. The range from CP0 to CP1 and the range from CP2 to CP3 are dead zones in which the torque transmission gain k does not change depending on the virtual clutch opening degree CP.

The clutch model 532 calculates the clutch output torque Tcout using the torque transmission gain k. The clutch output torque Tcout is torque output from the virtual clutch. The clutch model 532 calculates the clutch output torque Tcout from the virtual engine output torque Teout and the torque transmission gain k, for example, by the following equation (3). The clutch output torque Tcout calculated by the clutch model 532 is inputted to MT model 533.

(Mathematical formula 3)

$$Tcout=Teout \times k \tag{3}$$

In addition, the clutch model 532 calculates the slip-rate Rslip. The slip-rate Rslip is used to calculate the virtual engine speed Ne in the engine model 531. The slip ratio Rslip can be calculated using a map in which the slip ratio Rslip is given to the clutch-pedal depression amount Pc in the same manner as the torque-transmission gain k. Instead of such a map, the slip ratio Rslip may be calculated from the torque transmission gain k by the following equation (4) representing the relation between the slip ratio Rslip and the torque transmission gain.

(Mathematical formula 4)

$$Rslip=1-k \tag{4}$$

2-2-5. MT Modeling

MT modeling 533 calculates a gear ratio r. The gear ratio r is a gear ratio determined by the virtual gear stage GP in the virtual SMT. MT modeling 533 includes, for example, a map as illustrated in FIG. 6. In this map, the gear ratio r is given to the virtual gear stage GP. As shown in FIG. 6, the larger the virtual gear stage GP, the smaller the gear ratio r.

MT modeling 533 calculates the transmission output-torque Tgout using the gear ratio r. The transmission output torque Tgout is torque output from the virtual SMT. For example, MT modeling 533 calculates the transmission output torque Tgout from the clutch output torque Tcout and the gear ratio r by the following equation (5). The transmission output-torque Tgout calculated by MT model 533 is inputted to the axle/drive wheel model 534.

(Mathematical formula 5)

$$Tgout=Tcout \times r \tag{5}$$

2-2-5. Axle and Drive Wheel Models

The axle/drive wheel model 534 calculates the drive wheel torque Tw using a predetermined reduction ratio rr. The reduction ratio rr is a fixed value determined by the mechanical structure from the virtual SMT to the drive wheels 8. The overall reduction ratio R is obtained by multiplying the reduction ratio rr by the gear ratio r. For example, the axle/drive wheel model 534 calculates the drive wheel torque Tw from the transmission output torque Tgout and the reduction ratio rr by the following equation (6). The drive wheel torque Tw calculated by the axle/drive wheel model 534 is outputted to the required motor torque calculator 540.

(Mathematical formula 6)

$$Tw=Tgout \times rr \tag{6}$$

3. Other

In the above embodiment, a lever-type pseudo-shifter may be provided instead of the paddle-type pseudo-shifter. The lever-type pseudo shifter is configured to output an upshift signal by tilting the shift lever forward, and output a downshift signal by tilting the shift lever backward.

In the above-described embodiment, a pseudo H-type shifter and a pseudo clutch pedal may be provided instead of the pseudo sequential shifter. In the clutch model of MT vehicle model, the torque transmission gain may be calculated in accordance with the depression amount of the pseudo clutch pedal. Further, in MT model of MT vehicle model, the gear ratio may be calculated in accordance with the shift position of the pseudo H-type shifter.

Battery electric vehicle 10 according to the above embodiment does not include a transmission. However, the present disclosure is also applicable to a battery electric vehicle provided with a stepless or stepless automated transmission. In this case, the power train including the electric motor and the automatic transmission may be controlled so that the motor torque calculated by MT vehicle-model is outputted.

The disclosed motor torque control technique is not limited to a battery electric vehicle, and can be widely applied as long as it is a battery electric vehicle in which an electric motor is used as a power device for traveling.

What is claimed is:

1. A battery electric vehicle that uses an electric motor as a power device for traveling, the battery electric vehicle comprising:

an accelerator pedal;

a shifter;

a mode selection device that selects either a first mode or a second mode as a control mode of the electric motor in accordance with a mode selection operation of a driver; and a control device that controls the electric motor in accordance with the control mode selected by the mode selection device, wherein:

the control device is configured to, calculate a first command value or a second command value to be output to the electric motor, output the first command value when the electric motor is controlled in the first mode to change output of the electric motor in accordance with an operation of the accelerator pedal regardless of an operation position of the shifter, output the second command value when the electric motor is controlled in the second mode to change an output characteristic of the electric motor with respect to an operation of the accelerator pedal in accordance with an operation position of the shifter, and continue calculating
  the second command value while controlling the electric motor in the first mode, and
  the first command value while controlling the electric motor in the second mode; and the mode selection device is configured to automatically select a particular control mode among the first mode and the second mode when the battery electric vehicle is started.

2. The battery electric vehicle according to claim 1, wherein the particular control mode is the first mode.

3. The battery electric vehicle according to claim 1, wherein the driver is able to set the particular control mode.

\* \* \* \* \*